United States Patent [19]

Choi

[11] Patent Number: 5,270,822
[45] Date of Patent: Dec. 14, 1993

[54] RECEIVER CONTROL CIRCUIT FOR A TELEVISION FOR CONTROLLING PROGRAMS TO BE SUPPLIED FOR VIEWING

[75] Inventor: Seung L. Choi, Kyungki, Rep. of Korea

[73] Assignee: Samsung Electronics Co., Ltd., Rep. of Korea

[21] Appl. No.: 877,234

[22] Filed: May 1, 1992

[30] Foreign Application Priority Data

May 3, 1991 [KR] Rep. of Korea .................... 91-7166

[51] Int. Cl.[5] ............................................. H04N 5/44
[52] U.S. Cl. .................................. 358/188; 358/190; 358/194.1; 358/142; 380/20; 455/4.2; 455/6.1
[58] Field of Search ...................... 358/188, 190, 191.1, 358/194.1, 181, 142, 146, 147, 86, 349; 455/4.2, 3.1, 6.1, 6.2, 6.3, 45, 151.1, 158.1, 26.1; 380/10, 20

[56] References Cited

U.S. PATENT DOCUMENTS

| | | | |
|---|---|---|---|
| 4,225,884 | 9/1980 | Block et al. | 380/20 |
| 4,355,415 | 10/1982 | George et al. | 380/20 |
| 4,494,142 | 1/1985 | Mistry | 380/20 |
| 4,962,544 | 10/1990 | Igari | 455/158.1 |
| 5,053,884 | 10/1991 | Kamijyo | 380/20 |
| 5,065,235 | 11/1991 | Iijima | 358/194.1 |
| 5,097,260 | 3/1992 | Ahn | 380/20 |

Primary Examiner—James J. Groody
Assistant Examiner—Jeffrey S. Murrell
Attorney, Agent, or Firm—Sughrue, Mion, Zinn, Macpeak & Seas

[57] ABSTRACT

A receiver control circuit for a television, includes a main receiving part, a first receiving circuit, a driving control part, and a comparing part, wherein the main receiving part receives television signals for particular channels and, the first receiving circuit receives the television signals of particular channels and outputs driving adjusting signals. The driving control part outputs driving signals to the comparing circuit which compares the frequency bands of the television signals received by the main receiving part and the first receiving circuit to control the power source of the first receiving in order to prevent minors from watching undesirable broadcasting programs.

5 Claims, 3 Drawing Sheets

RECEIVER CONTROL CIRCUIT FOR A TELEVISION FOR CONTROLLING PROGRAMS TO BE SUPPLIED FOR VIEWING

FIELD OF THE INVENTION

The present invention relates to a television, and more particularly to, a receiving control circuit for a television in which a receiving frequency band of television can be adjusted, so that minors can not watch special programs performed by broadcasting stations such as violent programs, adult programs and the like.

BACKGROUND OF THE INVENTION

Due to the increase in the number of broadcasting stations and the consequent competitions between the broadcasting stations, they are broadcasting adult programs, violence programs, erotic programs and the like regardless of the time of the day in order to increase viewing proportions.

Such adult programs can give emotionally harmful effects to minors and children.

Particularly, due to the trend that each of the minors in the family possesses one television set, parents are not in a position to control the viewing of the programs of the minors, with the result that the problem of the viewing of adult programs by minors has become serious.

SUMMARY OF THE INVENTION

The present invention overcomes the above described problem. Therefore, it is an object of the present invention to provide a receiving control circuit for a television, in which, if a frequency band of television signals (to be called TV signals below) of a main receiving part of the TV for parents and the frequency band of the TV signals of a plurality of the receiving part of the TV for minors is the same, the supply of power to the receiving part for the minors is disconnected, thereby keeping the minors from watching harmful programs.

It is another object of the present invention to provide a receiving control circuit for a television, in which a secret code is applied to an input part of the television for parents. When the secret code is provided, even if frequency bands for the main and television receiving parts displayed by the minors are the same, only televisions for parents perform normal operations like usual televisions.

It is still another object of the present invention to provide a receiving control circuit for a television, in which, if a broadcasting station broadcasts adult programs, pilot signals are synthesized and the control circuit blocks the signals containing the pilot signals, so that the minors should be kept from watching harmful programs.

In achieving the above objects, the receiving control circuit for the television according to the present invention comprises a main receiving part for receiving broadcast television signals of particular channel bands, a first receiving circuit for receiving the TV signals of the particular channel bands, when a secret number is provided, and for producing driving adjusting signals, a comparing circuit for controlling the power source of the first receiving circuit by comparing the frequency bands of the TV signals received to the main receiving part and to the first receiving circuit, a driving control part for selecting the driving signals of the comparing circuit by providing the driving adjusting signals output form the first receiving circuit.

In achieving the above objects, the receiving control circuit for the television according to the present invention further comprises a transmitting means for synthesizing the pilot signals with modulated video signals to send them together with modulated audio signals, a second receiving circuit including one or more tuners and for receiving the TV signals of particular channels, a first receiving circuit for receiving the TV signals of the particular channels, a driving control part for providing driving signals, a control circuit for being driven in accordance with the driving signals of the driving control part and for controlling the output of the TV signals containing the pilot signals among the TV signals received into the tuners, and a synthesizing part for synthesizing the TV signals of the control circuit to supply them to the first receiving circuit.

BRIEF DESCRIPTION OF THE DRAWINGS

The above object and other advantages of the present invention will become more apparent by describing in detail the referred embodiment of the present invention with reference to the attached drawings, in which.

DETAILED DESCRIPTION OF THE PREFERRED EMBODIMENT

The present invention will be now described in more detail with reference to accompanying drawings.

Figure 1:
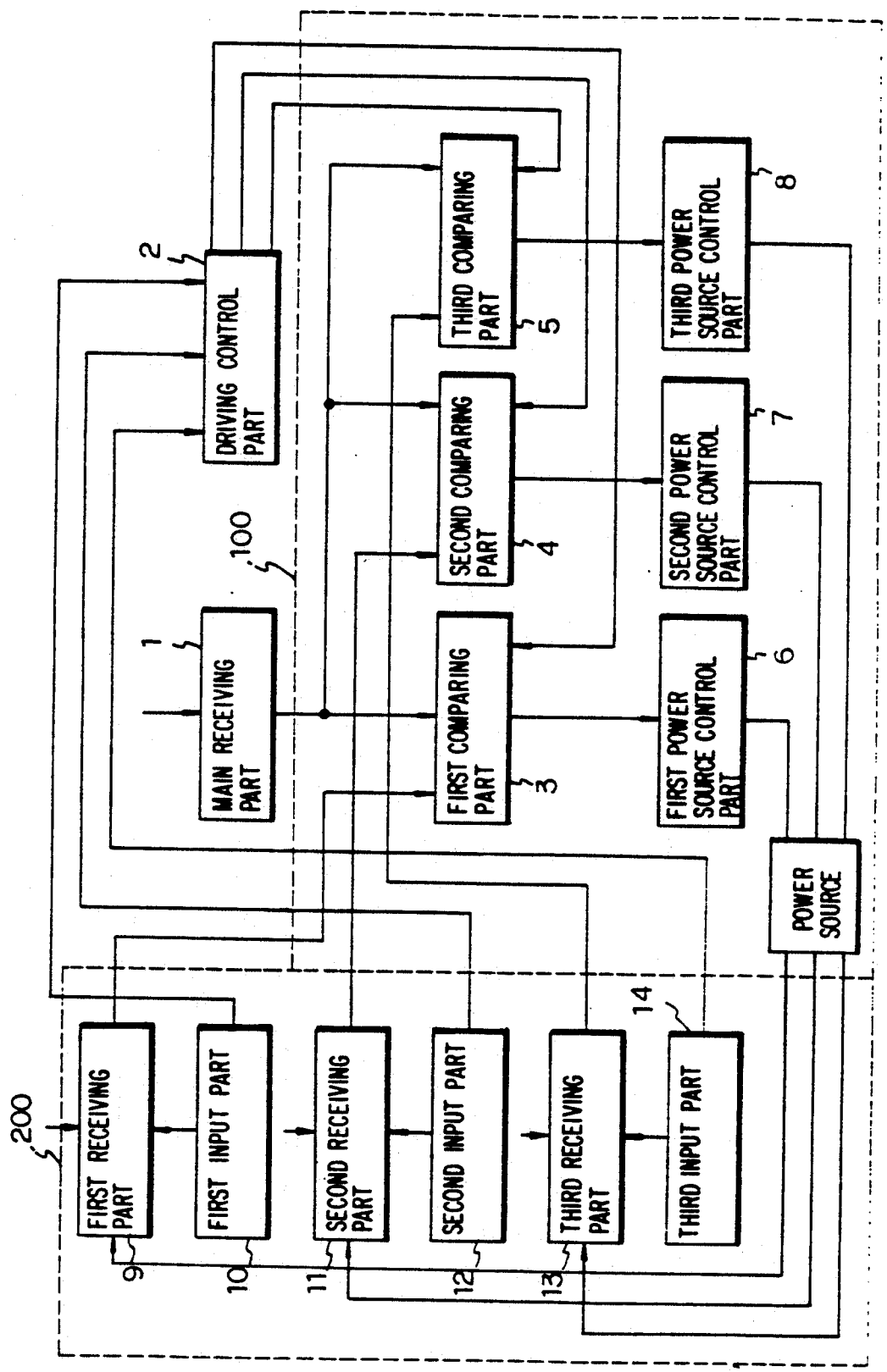
FIG. 1 is a block diagram showing a receiving control circuit for a television according to the present invention.

FIG. 1 shows a block diagram of a receiving control circuit, wherein the circuit comprises a main receiving part 1, a first receiving circuit 200, a driving control part 2, and a comparing circuit 100.

The main receiving part 1 is similar to conventional TV receivers, but further includes a F/V converter (Frequency/Voltage Converter) so as to be connected to a local OSC (Oscillator) and convert the local oscillating frequency determined according to channel selection to a voltage. Accordingly, an output from the main receiving part 1 becomes an output from the F/V converter.

The first to third receiving parts 9, 11, 13 of the first receiving circuit 200 have the same configuration as the main receiving part 1 except that they are controlled by the first to third input parts 10, 12, 14 and selecting a channel.

The first to third input parts 10, 12, 14 include a key matrix and a memory device, store predetermined secret codes, and select receiving channels of the first to third receiving parts 9, 11, 13.

Figure 2:
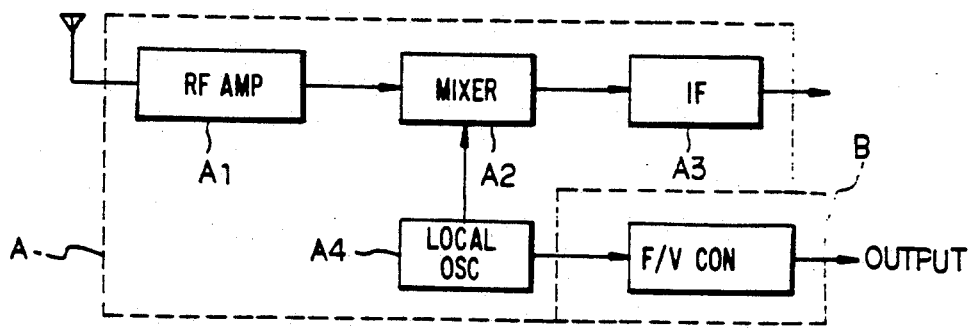
FIG. 2 is a block diagram for respective receiving part of FIG. 1.

The outputs from the first to third receiving parts 9, 11, 13 become signals having a given F/V conversion to a local OSC frequency of these receiving parts 9, 11, 13 according to a channel selected from these receiving parts 9, 11, 13 like the main receiving part 1. FIG. 2 shows a block diagram for generating output signals from the main receiving part 1 and the first to third receiving parts 9, 11, 13.

A block A shows a conventional TV receiver including an RF amplifier A1, a Mixer A2, an intermediate frequency amplifier A3 and a local OSC.

Output signals are generated by connecting the F/V converter B to the local OSC A4 and converting an output frequency from the local OSC A4 to a voltage level.

When the user does not activate a stored secret code by adjusting the key matrix, the first to third input parts 10,12,14 supply driving control signals for the driving control part 2.

The driving control part 2 supplies the driving signals for the comparing circuit 100 in accordance with the driving control signals supplied by the first to third input part 10,12,14.

The driving control part 2 is provided with a selecting switch outside thereof, and therefore, it can selectively apply the driving signals to the comparing circuit 100.

The comparing circuit 100 compares the frequency bands of the TV signals which are received by the main receiving part 1 and by the first to third receiving parts 9,11,13, connected to first to third comparing parts 3,4,5 which output the power source control signals after comparing the frequency bands of the supplied signals.

Because the first to third comparing parts 3, 4, 5 are connected to the driving control part 2, the comparing parts are driven with respect to the driving signals.

The comparing circuit 100 is constituted such that the first to third comparing parts 3,4,5 are connected to first to third power source control parts 6,7,8 which control the power sources of the first to third receiving parts 9,11,13 in accordance with the power source control signals.

Figure 3:
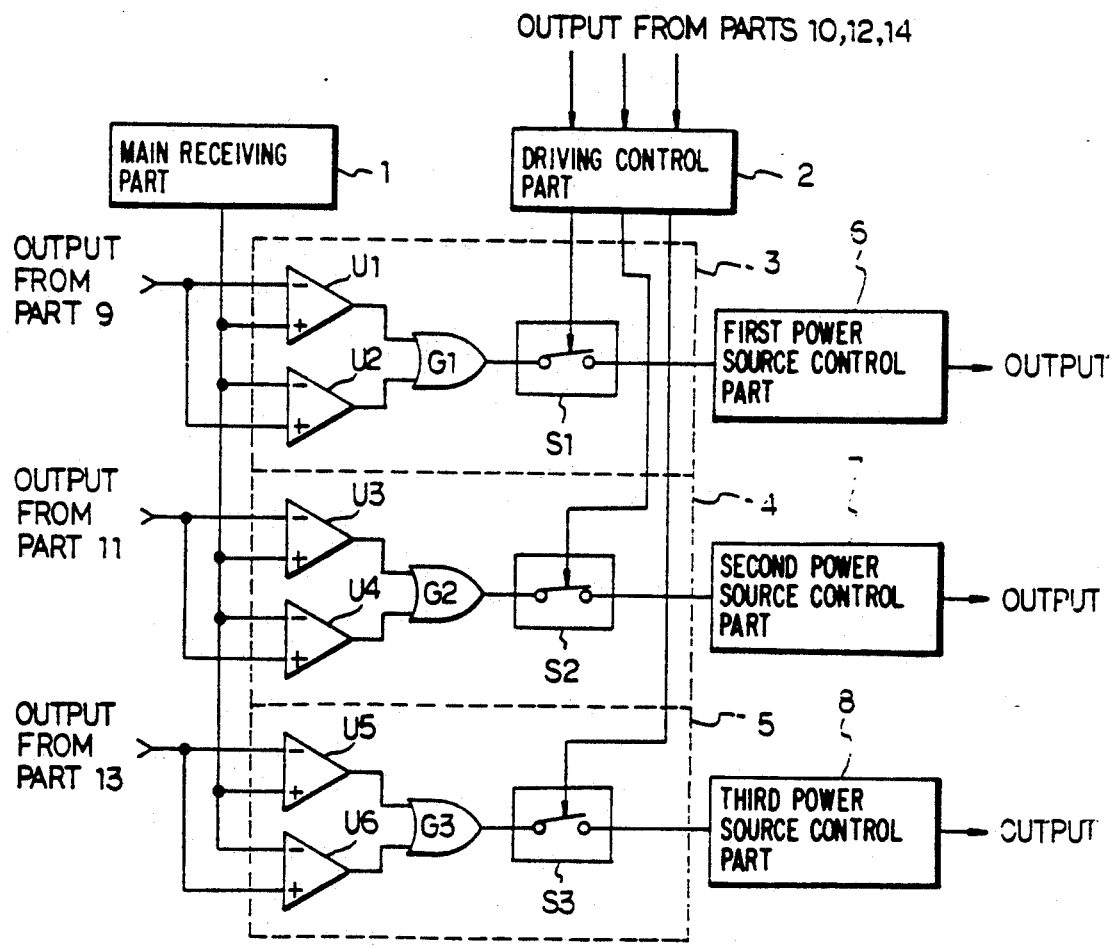
FIG. 3 is a detailed circuit diagram for first, second and third comparing parts of FIG. 1.

FIG. 3 shows a detailed circuit diagram of the preferred embodiment for the first to third comparing parts 3, 4, 5.

The first comparing part 3 includes two comparators U1, U2 connected to a main receiving part 1 and the first receiving part 9 differently from each other in polarity of input stage, OR gate G1 connected to both outputs from the comparators U1, U2, and a first switching circuit S1 for applying or cutting off the output signals from an OR gate G1 to a first power source control part 6 according to an output from a driving control part 2.

The second comparing part 4 includes two comparators U3, U4 connected to a main receiving part 1 and the second receiving part 11 differently from each other in polarity of input stage, an OR gate G2 connected to both outputs from the comparators U3, U4, and a second switching circuit S2 for applying or cutting off the output signals of OR gate G2 to a second power source control part 7 according to an output from a driving control part 2.

The third comparing part 5 includes two comparators U5, U6 connected to a main receiving part 1 and the third receiving part 13 differently from each other in polarity of input stage, an OR gate G3 connected to both outputs from the comparators U5, U6, and the third switching circuit S3 for applying or cutting off the output signals from OR gate G3 to a third power source control part 8 according to an output of the driving control part 2.

The comparing parts and the power source control parts of the comparing circuit 100 and the receiving parts and the input parts of the first receiving circuit 200 are limited to 3 in their numbers, but their numbers can be increased.

In the receiving control circuit for the television according to the present invention as described above, one who possesses the main receiving part 1 in his (or her) television makes a judgment whether the particular broadcasting program is acceptable for viewing by those who possess the first to third receiving parts 9,11,13.

Further, the user who possesses the main receiving part 1 can control the main receiving part 1 in such a manner that he can receive the TV signals which cannot be permitted to those who possess the first to third receiving parts 9,11,13.

Further, the user of the main receiving part 1 judges which one of the first to third receiving parts 9,11,13 should not be permitted to the respective users.

Then, the user selects one or more among the comparing parts 3,4,5 by manipulating the external selection switch of the driving control part 2.

Therefore, it can be said that the driving of the first to third comparing parts 3,4,5 is controlled by the driving control part 2.

In case where those who possess the first to third receiving parts 9,11,13 are using the same frequency band as that of one who possesses the main receiving part 1, the first to third comparing parts 3,4,5 will supply the power source control signals to the first to third power source control parts 6,7,8, thereupon disconnecting the power sources for the first to third receiving parts 9,11,13 so as for the driving of the first to third receiving parts 9,11,13 to be stopped.

That is, when a current receiving channel of the first receiving part 9 becomes equal to that of the main receiving part 1, both output frequencies from a local OSC becomes same and F/V converted levels of both receiving parts 1, 9 becomes same.

Accordingly, both input levels from the comparators U1, U2 becomes same as shown in FIG. 3 and outputs from the comparators U1, U2 become low level because both inputs are low level.

At this time, the first switching circuit S1 is kept "on" and an output from the OR gate G1 is applied to the first power source control part 6 by way of the first switching circuit S1.

Therefore, the first power source control part 6 cuts off the power source circuit (not shown) according to the low level signals of the comparator 3 and keeps the first receiving part 9 "OFF" so that it becomes impossible to watch the TV program thereby.

However, if a channel of the main receiving part 1 is different from that of the first receiving part 9, the local OSC frequencies both receiving parts 1, 9 are different from each other and their F/V converted voltage levels become different from each other.

Accordingly, one of the comparators U1, U2 becomes high level and an output from the OR gate G1 becomes high level and is applied to the first power source control part 6.

Thus, the first power source control part 6 keeps the first receiving part 9 in a normal driving state.

The above operations are performed in a same manner for the other receiving parts 11, 13, comparators (U3,U4),(U5,U6), OR gates G2, G3, switching circuits S2, S3, and power source control parts 7,8.

However, if those who pass the first to third receiving parts 9,11,13 are adults, it will not be proper for the user of the main receiving part 1 to restrict viewing by those who pass the first to third receiving parts 9,11,13.

As a measure against such a case, the secret codes are applied to the first to third receiving input parts 10,12,14. If the keys of the third input parts 10,12,14 are driven, the driving control part 2 stops the driving of the relevant one among the comparing parts 3,4,5.

Under this condition, the function of the driving part 2 has to be such that the driving control signals of the first to third input parts 10,12,14 should be given a priority to the driving by the external selecting switch.

Accordingly, in the embodiment of FIG. 1, the user of the main receiving part 1 and those who possess the first to third receiving parts 9,11,13 can be protected from being denied the receiving of the signals through the first to third receiving parts 9,11,13.

Figure 4:
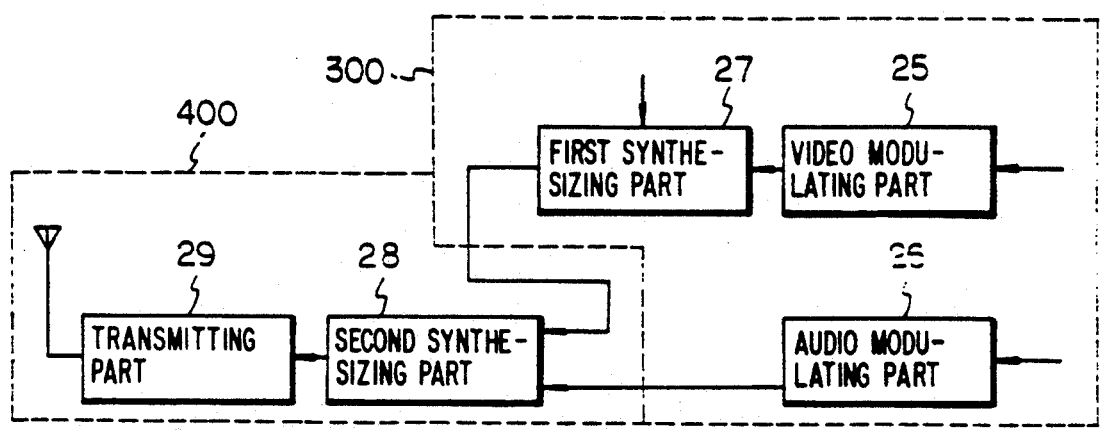
FIG. 4 is a block diagram showing a transmitting means of another embodiment of a receiving control circuit according to the present invention.
Figure 5:
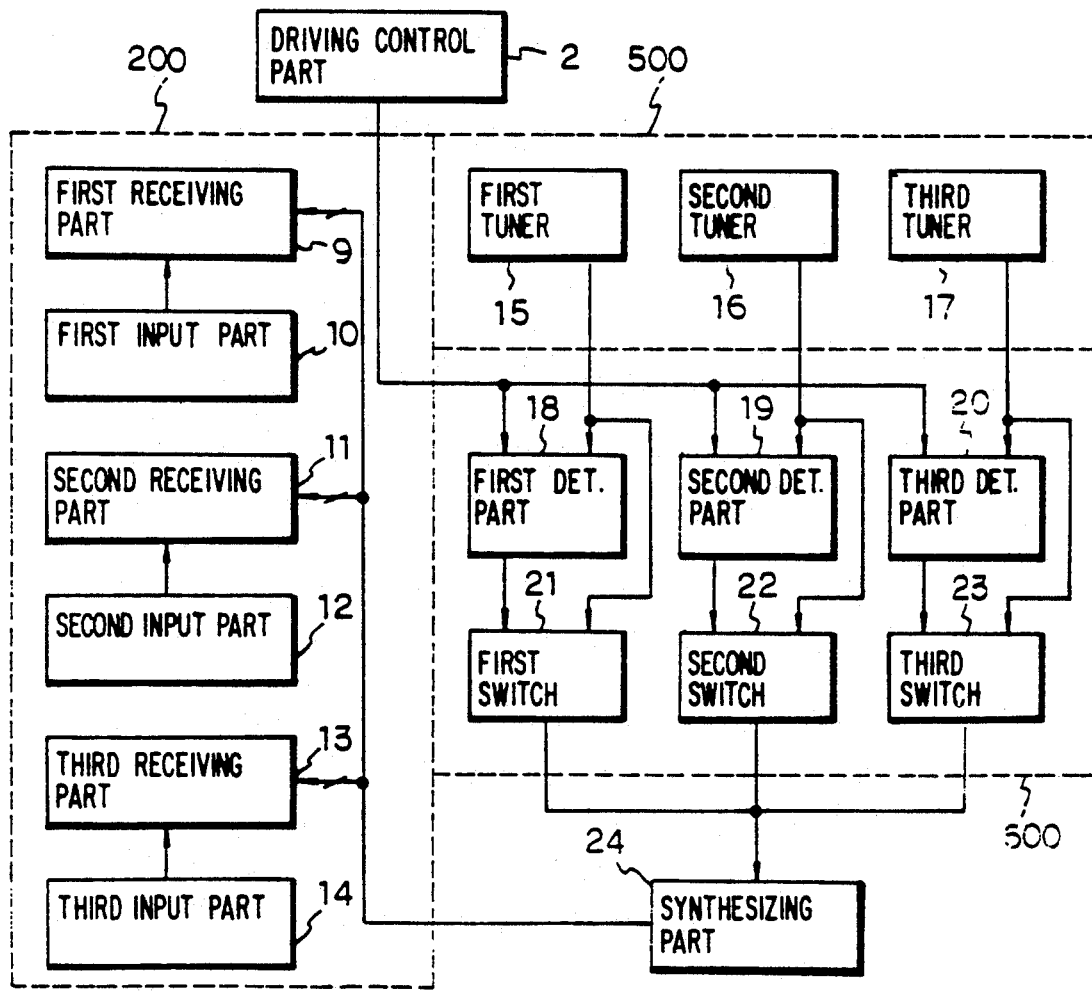
FIG. 5 is a block diagram showing still another embodiment of a receiving control circuit according to the present invention.

As shown in FIGS. 4 and 5, the receiving circuit comprises a modulating circuit 300, a transmitting means in the form of a transmitting circuit 400, a first receiving circuit 200, a second receiving circuit 500, a driving control part 2, a control circuit 600, and a synthesizing part 24.

To describe them more specifically, the modulating circuit 300 includes a video modulating part 25 and an audio modulating part 26, and modulates video signals and audio signals to a radio frequency band, while the modulated video signals are synthesized with the pilot signals by a synthesizing part 27.

Under this condition, the pilot signals are synthesized with the video signals by the first synthesizing part 27 only for the programs which are restricted so as for minors not to watch the programs.

The transmitting circuit 400 includes a second synthesizing part 28 for synthesizing the modulated video and audio signals and a transmitting part 29 for transmitting the synthesized video and audio signals.

The first receiving circuit 200 is in the same form as that of FIG. 1, except the fact that, in FIG. 5, the first to third receiving parts 9,11,13 selectively receive the TV signals supplied from the synthesizing part 24, and that the driving control part 2 is not controlled by the first to third input parts 10,12,14.

The second receiving circuit 500 includes first to third tuners 15,16,17, which respectively receive TV signals of the different frequency bands. The driving control part 2 outputs driving signals output in accordance with the externally selected switches.

The control circuit 600 controls the output of the TV signals containing the pilot signals among the TV signals received into the tuners 15,16,17 in accordance with the driving signals of the driving control part 2. The control circuit 600 includes first to third detecting parts 18,19,20 which output switching signals by detecting the inclusion of the pilot signals among the TV signals which are driven by the driving control part 2.

The control circuit 600 further includes first to third switches 21,22,23 which switch the first to third tuners 15,16,17 in accordance with the switching signals of the first to third detecting parts 18,19,20, and which apply the TV signals of the first to third tuners 15,16,17 to the synthesizing part 24.

Under this condition, the synthesizing part 24 makes the TV signals from the first to third switches 21,22,23 applied to the first receiving part 200.

In connection with the receiving control circuit of the present invention, the respective broadcasting stations modulate the video and audio signals to radio frequencies by the video modulating part 25 and the audio modulating part 26 when transmitting the video and audio signals.

When a broadcasting program is a violent program or an adult program, the broadcasting station supplies the pilot signals to the first synthesizing part 27, so that the synthesizing part 27 should mix the pilot signals with the video signals. The video and audio signals which are mixed with the pilot signals are synthesized by the second synthesizing part 28 before being transmitted by the transmitting part 29.

That is, according to the present invention, the broadcasting stations have to insert the pilot signals into programs which are unacceptable for the minors. Such TV signals from the broadcasting stations are received through the tuners 15,16,17 of the second receiving circuit 500 of the user for each frequency band.

The TV signals which are received through the respective tuners 15,16,17 are discriminated by the first to third detecting parts 18,19,20 whether they contain the pilot signals. If the TV signals contain the pilot signals, the first to third detecting parts 18,19,20 effect an off-state such that the first to third switches 21,22,23 should not apply the TV signals of the tuners 15,16,17 to the synthesizing part 24.

That is, the TV signals which contain the pilot signals are kept from being supplied to the synthesizing part 24 by the detecting parts 18,19,20 and the switches 21,22,23. Under this condition, the first, second, and third detecting parts 18,19,20 are controlled by the driving control part 2.

Therefore, even if the broadcasting station transmits the video signals mixed with the pilot signals because of the restrictive nature of the program, if the program may be watched by the users of the first to third receiving parts 9,11,13, the determination of the detecting parts 18,19,20 can be overridden, so that the TV signals should be supplied to the synthesizing part 24.

The TV signals of the tuners 15,16,17 are synthesized by the synthesizing part 24 after being supplied there, and the synthesized signals are supplied to the receiving parts 9,11,13. The receiving parts 9,11,13 select one set of signals from among the TV signals of the synthesizing part 24 so as to display on the TV, while the TV signals loaded with the pilot signals can not be watched by the users of the receiving parts 9,11,13.

Accordingly, if the broadcasting station shows the program as being adult program, the pilot signals are mixed into the TV signals when transmitting them. Thus, the TV signals loaded with the pilot signals are blocked by the detecting parts 18,19,20 and by the switches 21,22,23, so that the users of the receiving parts 9,11,13 cannot watch the TV signals loaded with the pilot signals.

According to the present invention as described above, the comparing part judges whether the TV signals received by the main receiving part and the TV signals received by the first to third receiving parts are the same or not, so that some of the first to third receiving parts can be de-activated. Alternatively, the broadcasting stations insert the pilot signals into TV signals, and the TV signals loaded with the pilot signals are blocked by the detecting parts and switches, so that the users of the first to third receiving parts should be restricted in watching TV programs.

What is claimed is:

1. A receiver control circuit for a television, comprising:
   main receiving means for receiving broadcast television signals of predetermined channel bands;
   a first receiving circuit for receiving said broadcast television signals from said predetermined channel bands and for generating driving adjusting signals, wherein said first receiving circuit includes means for activating a key code to ensure reception of said broadcast television signals;
   a comparing circuit for controlling operation of said first receiving circuit by comparing frequency bands of said broadcast television signals received by said main receiving means with frequency bands of said broadcast television signals received by said first receiving circuit; and
   driving control means for selecting said comparing circuit based upon said driving adjusting signals received from said first receiving circuit.

2. The receiver control circuit as claimed in claim 1, wherein said first receiving circuit comprises:
   at least one receiving means for receiving said broadcast television signals; and
   at least one input means for adjusting said frequency bands received by said at least one receiving means and for outputting driving adjusting signals to said driving control means.

3. The receiver control circuit as claimed in claim 1, wherein said comparing circuit comprises:
   at least one comparing means driven by said driving control means for generating operation control signals by comparing the frequency bands of said broadcast television signals received by said main receiving means and those received by said first receiving circuit; and
   at least one power source control means for controlling a power source coupled to said receiving circuit according to said operation control signals received from said comparing circuit.

4. A receiver control circuit for a television, comprising:
   transmitting means for transmitting television signals, wherein said transmitting means includes means for synthesizing pilot signals with selected modulated video signals and for synthesizing both of these signals together with modulated audio signals to include pilot signals in the television signals which require monitored viewing;
   a first receiving circuit for receiving said television signals for particular channels;
   a second receiving circuit including at least one tuner for receiving said television signals for particular channels;
   driving control means for providing driving signals;
   a control circuit driven according to the driving signals from said driving control means and for controlling an output of a television signal containing a pilot signal received from said at least one tuner; and
   synthesizing means for synthesizing the television signals received from said control circuit and for supplying a synthesized signal to said first receiving circuit.

5. The receiver control circuit as claimed in claim 4, wherein said control circuit comprises:
   at least one detecting means driven according to the driving signals from said driving control means to provide switching signals based upon detection of pilot signals in said television signals received by said at least one tuner; and
   at least one switch controlled by the switching signals received from said at least one detecting means to apply said television signals, which are received by said at least one tuner, to said synthesizing means.

* * * * *